US008719028B2

(12) United States Patent
Otani

(10) Patent No.: US 8,719,028 B2
(45) Date of Patent: May 6, 2014

(54) INFORMATION PROCESSING APPARATUS AND TEXT-TO-SPEECH METHOD

(75) Inventor: Michiaki Otani, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 889 days.

(21) Appl. No.: 12/640,534

(22) Filed: Dec. 17, 2009

(65) Prior Publication Data

US 2010/0174545 A1      Jul. 8, 2010

(30) Foreign Application Priority Data

Jan. 8, 2009   (JP) ................................. 2009-002346

(51) Int. Cl.
*G10L 13/08*          (2013.01)
(52) U.S. Cl.
USPC ........................................ 704/260
(58) Field of Classification Search
USPC ...................... 704/258–270.1, 275
See application file for complete search history.

(56) References Cited

U.S. PATENT DOCUMENTS

| | | | | |
|---|---|---|---|---|
| 6,246,981 | B1 * | 6/2001 | Papineni et al. | 704/235 |
| 6,604,074 | B2 * | 8/2003 | Ziegelmiller | 704/235 |
| 7,415,412 | B2 * | 8/2008 | Naoi | 704/260 |
| 7,711,564 | B2 * | 5/2010 | Levy et al. | 704/270 |
| 8,352,268 | B2 * | 1/2013 | Naik et al. | 704/258 |
| 2004/0193420 | A1 * | 9/2004 | Kennewick et al. | 704/257 |
| 2004/0215461 | A1 | 10/2004 | Whikehart | |
| 2005/0267757 | A1 | 12/2005 | Iso-Sipila | |
| 2007/0083366 | A1 | 4/2007 | Peters | |
| 2007/0260460 | A1 * | 11/2007 | Hyatt | 704/260 |
| 2009/0076821 | A1 | 3/2009 | Brenner et al. | |
| 2009/0216538 | A1 * | 8/2009 | Weinberg et al. | 704/275 |

FOREIGN PATENT DOCUMENTS

| | | |
|---|---|---|
| CN | 1989547 A | 6/2007 |
| DE | 102004020710 A1 | 11/2004 |
| EP | 1964828 A2 | 9/2008 |
| FR | 2854484 A1 | 11/2004 |
| GB | 2404545 A | 2/2005 |

(Continued)

OTHER PUBLICATIONS

Schulz C H et al, << A Spoken Language Front-end for a Multilingual Music Data Base >> [Online] XP003014547 Retrieved from the Internet : URL:http://www.dfki.de/{romanell/BerlinerXMLT-age2004.pdf> [retrieved on Jan. 1, 2007], 9 pages.

(Continued)

*Primary Examiner* — Abul Azad
(74) *Attorney, Agent, or Firm* — Brinks Gilson & Lione

(57) ABSTRACT

An information processing apparatus for playing back data includes an oral reading unit, a storage unit storing text templates for responses to questions from a user and text template conversion rules, an input unit for inputting a question from a user, and a control unit for retrieving data and items of information associated with the data. The control unit analyzes a question about a data from a user, for example, a question about a tune, to select a text template for a response to the question and detects the characters in items of tune information of the tune. The characters are designated to replace replacement symbols included in the text template. The control unit also converts the text template based on whether the characters can be read aloud, generates a text to be read aloud using the converted text template, and causes the oral reading unit to read the text aloud.

18 Claims, 8 Drawing Sheets

(56) References Cited

FOREIGN PATENT DOCUMENTS

| | | |
|---|---|---|
| JP | 2007-509377 | 4/2007 |
| JP | 2009505321 T | 2/2009 |
| KR | 20080043358 A | 5/2008 |
| WO | WO 2005/116991 A1 | 12/2005 |
| WO | WO 2007/022533 A2 | 2/2007 |

OTHER PUBLICATIONS

European Search Report and Annex to the Search Report in European Patent Application No. EP 10 15 0362, dated Apr. 19, 2010, 2 pages.

* cited by examiner

FIG. 2A

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | nu |   |   |   |   |   |   |   |   |   |   |   |   |   |   |   |
| 1 |   |   |   |   |   |   |   |   |   |   |   |   |   |   |   |   |
| 2 | sp(*1) | ! | " | # | $ | % | & | ' | ( | ) | * | + | , | - | . | / |
| 3 | 0 | 1 | 2 | 3 | 4 | 5 | 6 | 7 | 8 | 9 | : | ; | < | = | > | ? |
| 4 | @ | A | B | C | D | E | F | G | H | I | J | K | L | M | N | O |
| 5 | P | Q | R | S | T | U | V | W | X | Y | Z | [ | \ | ] | ^ | _ |
| 6 | ` | a | b | c | d | e | f | g | h | i | j | k | l | m | n | o |
| 7 | p | q | r | s | t | u | v | w | x | y | z | { | \| | } | ~ |   |
| 8 |   |   |   |   |   |   |   |   |   |   |   |   |   |   |   |   |
| 9 |   |   |   |   |   |   |   |   |   |   |   |   |   |   |   |   |
| A | sp(*1) | ¡ | ¢ | £ | ¤ | ¥ | ¦ | § | ¨ | © | ª | « | ¬ | | ® | ¯ |
| B | ° | ± | ² | ³ | ´ | µ | ¶ | · | ¸ | ¹ | º | » | ¼ | ½ | ¾ | ¿ |
| C | À | Á | Â | Ã | Ä | Å | Æ | Ç | È | É | Ê | Ë | Ì | Í | Î | Ï |
| D | Ð | Ñ | Ò | Ó | Ô | Õ | Ö | × | Ø | Ù | Ú | Û | Ü | Ý | Þ | ß |
| E | à | á | â | ã | ä | å | æ | ç | è | é | ê | ë | ì | í | î | ï |
| F | ð | ñ | ò | ó | ô | õ | ö | ÷ | ø | ù | ú | û | ü | ý | þ | ÿ |

*1 SPACE

FIG. 2B

| CHARACTER | CHARACTER CODE | CONVERTED CHARACTER STRING | | |
|---|---|---|---|---|
| | | US English | Canadian French | American Spanish |
| # | 0 × 23 | number | numéro | número |
| & | 0 × 26 | and | et | y |
| @ | 0 × 40 | at | at | arroba |

FIG. 3A

1. It is <Song> by <Artist>.
2. This song is called <Song> by <Artist> from <Album>.
3. This is called <Song> by <Artist> from <Album>.

<Song>   :TUNE NAME
<Artist> :ARTIST NAME
<Album>  :ALBUM NAME

FIG. 3B

| No. | ITEM UNABLE TO READ ALOUD | RULE |
|---|---|---|
| 1 | ARTIST NAME | REMOVE "by <Artist>" FROM BASE TEMPLATE TEXT |
| 2 | ALBUM NAME | REMOVE "from <Album>" FROM BASE TEMPLATE TEXT |
| 3 | TUNE NAME | USE NEW TEMPLATE TEXT<br>This track's artist is <Artist>.<br>This track's album is <Album>. |

FIG. 4A

| ITEM | EXAMPLE 1 | EXAMPLE 2 | EXAMPLE 3 | EXAMPLE 4 |
|---|---|---|---|---|
| TUNE NAME | Happy Song | One Night Magic | 離したくはない | Piano Concerto #21 in C, K467 |
| ARTIST NAME | Mariah Carey | 宇多田 ヒカル | T-BOLAN | Royal Philharmonic Orchestra |
| ALBUM NAME | All of you | ULTRA BLUE | — | The Great Piano Concertos Vol. 1 |
| COMPOSER'S NAME | Mariah Carey | 宇多田 ヒカル | — | Wolfgang Amadeus Mozart |
| GENRE | Pop | Pop | Rock | Classic |

FIG. 4B

| TAG INFORMATION | EXTRACTED DATA | DATA TO BE INPUT INTO TTS |
|---|---|---|
| TUNE NAME | One Night Magic | One Night Magic |
| ARTIST NAME | 宇多田 ヒカル | (SPACE) |
| ALBUM NAME | ULTRA BLUE | ULTRA BLUE |

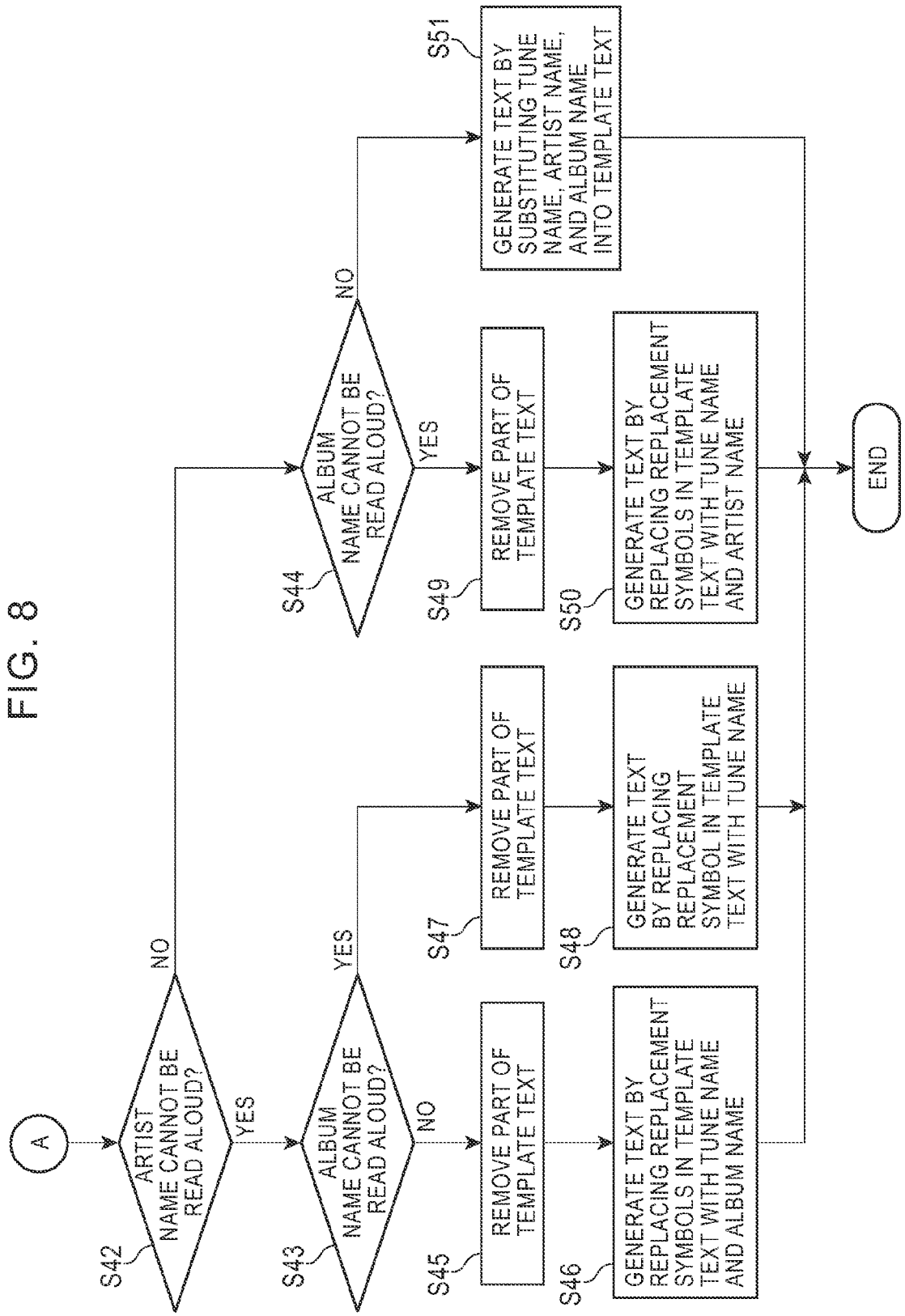

INFORMATION PROCESSING APPARATUS AND TEXT-TO-SPEECH METHOD

RELATED APPLICATIONS

The present application claims priority to Japanese Patent Application Number 2009-002346, filed Jan. 8, 2009, the entirety of which is hereby incorporated by reference.

BACKGROUND

1. Field of the Invention

The present invention relates to information processing apparatuses and text-to-speech methods, and in particular, relates to a technique for generating a text to be read aloud by an information processing apparatus including a function of reading text information aloud (a text-to-speech (TTS) engine).

2. Description of the Related Art

Recently, systems including a function of reading, upon inputting a text, the text aloud (a TTS engine) have been developed to be widely used in, for example, telephone answering service for cellular phones. For example, in personal mobile service, such systems are used as a voice service for reading aloud information such as electronic mail, news, and market trends in response to a phone call made by a user even when a mobile terminal, a computer, or the like does not exist near the user.

On the other hand, it is common to connect a device storing audio information to be reproduced to audio equipment and reproduce music on the basis of the audio information. Such audio information includes tune (song) data. Tune data includes, together with the digital data of a tune, tag data in which information such as the title and artist of the tune is described. For example, it has become possible to, on the basis of tag data, display the title of a tune that is being reproduced or the like on a display screen or read the title of the tune or the like aloud, using a TTS engine.

When text is read aloud (orally) using a TTS engine, a text input into the TTS engine is precisely converted to speech signals. Thus, it is necessary to input correct text into the TTS engine. Japanese Unexamined Patent Application Publication (Translation of PCT Application) No. 2007-509377 discloses a technique for inputting a correct text into a TTS engine, e.g., checking the spelling of a text to be input into a TTS engine and converting an ambiguous text to a correct text by checking with a user about the ambiguous text.

The oral reading of tag information of digital audio such as a tune name and an artist name (tune information) can be heard using a text-to-speech conversion function, as described above. Regarding such tune information, a text to be converted to speech may be generated by replacing predetermined replacement symbols in a text template that is prepared in advance with the characters of tune information acquired from digital audio equipment.

When all of the tune information used in a text template can be read aloud, the text that is generated includes no grammatical error, and thus an appropriate speech response is returned to a question.

However, when tag information includes characters that cannot be handled by a TTS engine, for example, Chinese characters in a case where the TTS engine supports American English, since the portion of the Chinese characters cannot be read aloud, in general, the portion is set as a blank portion. Thus, no speech is output for the blank portion. Even in this case, portions other than the portion replaced with blanks in a text template are converted to speech. As a result, an unnatural text is read aloud. For example, it is assumed that a text template of a response to a question "What song is this?" is "It is <Song> by <Artist>", <Song> is replaced with a tune name, and <Artist> is replaced with an artist name. In this case, when the tune name is "Happy Song", and the artist name does not exist, the response text is "It is Happy Song by," which is an unnatural speech output.

SUMMARY

In view of the problem with the known arts, it is an object of the present invention to provide an information processing apparatus and a text-to-speech method in which, even when a part of information is missing, a natural talk-back response can be returned by constructing a natural speech phrase.

To solve the aforementioned problem with the known arts, an information processing apparatus according to a first aspect of the present invention is provided. The information processing apparatus is connected to an apparatus storing data to be played back so that the information processing apparatus can communicate with the apparatus. The information processing apparatus may include an oral reading unit that comprises a function for converting text to speech data in order to output the speech data, a storage unit that stores text templates for responses to questions from a user and text template conversion rules, an input unit that inputs a question from a user, and a control unit that retrieves data and items of information associated with the data from the apparatus storing the data. The control unit analyzes a question about particular data from a user to select a text template for a response to the question, detects characters in items of the information associated with the data, and detects the characters that will replace the replacement symbols included in the text template in order to convert the text template in a manner that depends on whether the characters can be read aloud. The control unit also generates a text to be read aloud using the converted text template, and causes the oral reading unit to read the text aloud.

In the information processing apparatus according to the first aspect, the control unit may select the text template in a manner that depends on a genre of the tune, and upon determining that one of the items of the tune information cannot be read aloud, the control unit may generate a text using the text template or generate a text using a new text template. The text template may have a modifier equivalent portion that includes a replacement symbol. The replacement symbol identifies a section of the template to be replaced with the item of the information.

Moreover, according to the first aspect where the data is tune data, upon determining that, out of the items of tune information associated with a tune, an artist name cannot be read aloud, the control unit may generate a text using the a text template that has a modifier equivalent portion, including a replacement symbol to be replaced with the artist name, removed. Upon determining that, out of the items of tune information associated with the tune, an album name cannot be read aloud, the control unit may generate a text using the text template that has a modifier equivalent portion, including a replacement symbol to be replaced with the album name, removed. Upon determining that, out of the items of tune information associated with the tune, a tune name cannot be read aloud, the control unit may extract from the storage unit a new text template that includes a replacement symbol to be replaced with an artist name of the tune as a component, and a new text template that includes a replacement symbol to be replaced with an album name of the tune as a component. The control unit may also generate a text using the new text templates.

In the information processing apparatus according to an embodiment of the present invention, when a tune acquired from digital audio equipment is being played back, a response text is generated based on a text template for a response to a question from a user about the tune information. In the process of generating the response text, characters of the tune information that cannot be read aloud are converted to spaces, and a part of the text template is changed to convert the text template to a text having no grammatical problem when read aloud using a TTS engine. For example, in a case where a text template for a response to the question "What am I listening to?" is "This Song is called <Song> by <Artist> from <Album>," where <Song>, <Artist>, and <Album> are respectively replaced with a tune name, an artist name, and an album name contained in the tune information, when it is determined that the characters of the artist name cannot be read aloud, a text to be read aloud is generated by converting the text template for the response to "This Song is called <Song> from <Album>."

Characters that cannot be read aloud are converted to spaces, and the response text is generated by removing a portion of the text template corresponding to a modifier including the characters that cannot be pronounced and a preposition preceding the characters. Thus, a natural text can be read aloud.

Moreover, a text-to-speech method according to a second aspect of the present invention is provided. The text-to-speech method may include the steps of a) analyzing a question about data, for example, a tune received by the, b) extracting a text template corresponding to the question from text templates for responses that are stored in a storage unit, c) detecting characters in items of the information of the data, where the characters are designated to replace replacement symbols included in the text template, d) performing conversion of the text template in a manner that depends on whether the characters can be read aloud, e) generating a text to be read aloud by replacing replacement symbols in the converted text template with the characters, and f) converting the text to speech data to output the speech data.

In the text-to-speech method according to the second aspect may also include the steps of selecting candidates for the text template for a response to the question from the text templates for responses stored in the storage unit, and, in the case where the data is tune data, detecting a genre of the tune by analyzing the tune information, and selecting a text template corresponding to the genre from the candidates for the text template.

Moreover, in the text-to-speech method according to the second aspect, the method may also include the steps of determining whether any one of the items of the information cannot be read aloud, and converting the text template to a new text template upon determining that one of the items of the information cannot be read aloud.

The foregoing paragraphs have been provided by way of general introduction, and are not intended to limit the scope of the following claims. The described embodiments will be best understood by reference to the following detailed description taken in conjunction with the accompanying drawings.

BRIEF DESCRIPTION OF THE DRAWINGS

FIG. 2A is a character code table showing characters that can be read aloud and characters that cannot be read aloud, and FIG. 2B is a diagram showing exemplary character conversion rules;

FIG. 3A is a diagram showing exemplary base text templates for a response to a question, and FIG. 3B is a diagram showing exemplary base text template conversion rules;

FIG. 4A is a diagram showing examples of tune data acquired from digital audio equipment, and FIG. 4B is a diagram showing a case where extracted items of data of tune information are converted to items of TTS input data;

FIG. 8 is a flowchart (2) showing an exemplary process of generating a response text corresponding to items of tune information that cannot be read aloud.

DESCRIPTION OF THE PREFERRED EMBODIMENTS

An embodiment of the present invention will now be described with reference to the attached drawings.

Figure 1:
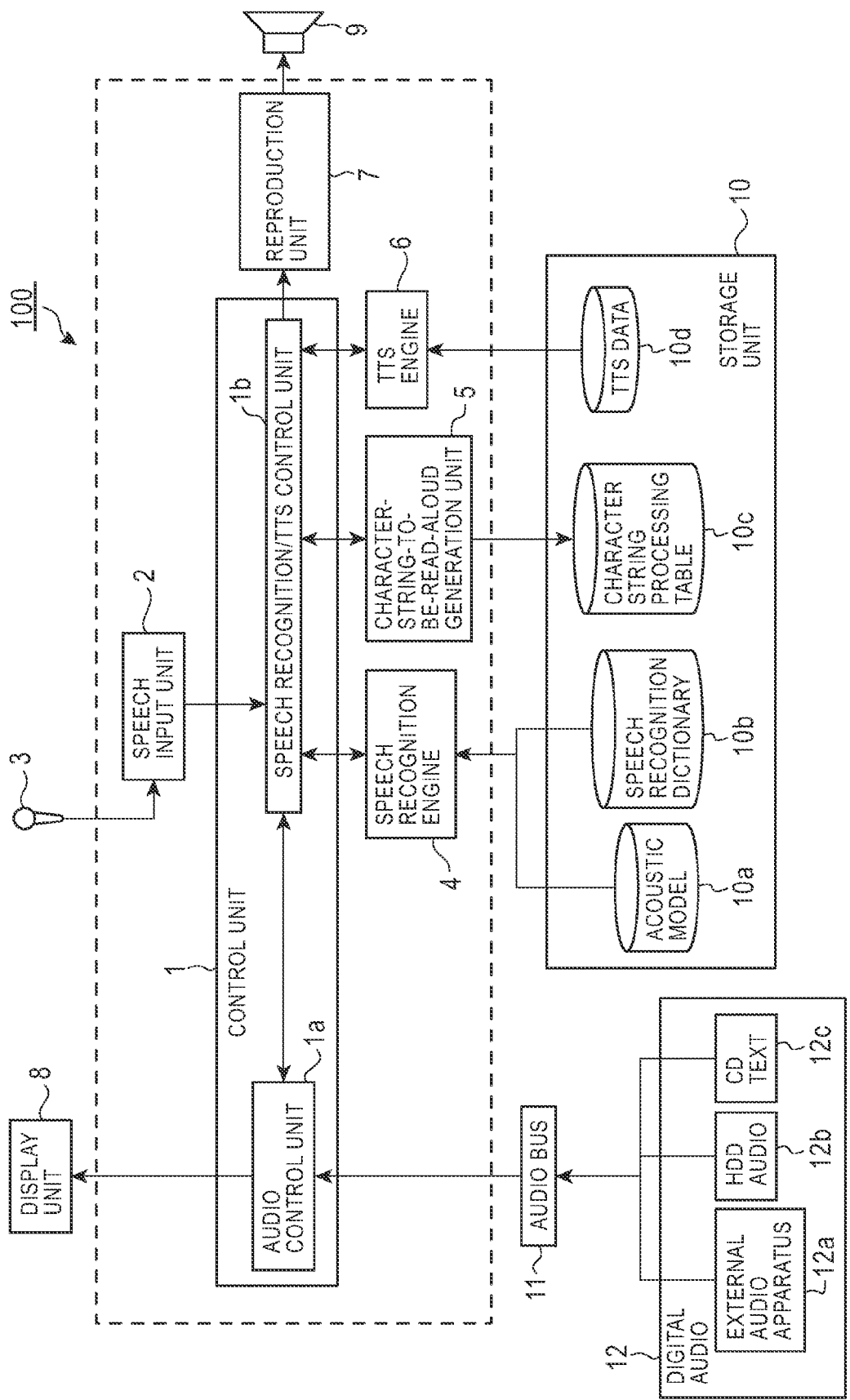
FIG. 1 is a diagram showing the components of an information processing apparatus according to an embodiment of the present invention.

FIG. 1 is a diagram showing the components of an information processing apparatus 100 according to the embodiment of the present invention.

The information processing apparatus 100 according to the embodiment includes a control unit 1 (an audio control unit 1a and a speech recognition/TTS control unit 1b), a speech input unit 2, a speech recognition engine 4, a character-string-to-be-read-aloud generation unit 5, a TTS engine 6, a reproduction unit 7, a display unit 8, a microphone 3, a speaker 9, and a storage unit 10.

Digital audio equipment 12 is connected to the information processing apparatus 100 via an audio bus 11. The digital audio equipment 12 includes, for example, an external audio apparatus 12a, a hard disk drive (HDD) audio apparatus 12b, and a Compact Disc (CD) text apparatus 12c. The HDD audio apparatus 12b may be a portable music player including a hard disk as a storage unit. The CD text apparatus 12c may be a player supporting CD-Text specifications and displays text information such as the title of a CD and a composer.

For example, tune files in Motion Picture Experts Group (MPEG)-1 Audio Layer-3 (MP3) format or the like delivered via the Internet or the like are first downloaded to a personal computer (PC) and further transferred from the PC to be stored in the digital audio equipment 12. A tune file includes, in addition to audio information to be reproduced, tune information (for example, a title, an artist name, and an album name) for identifying the audio information.

The audio control unit 1a includes a microcomputer. The audio control unit 1a retrieves audio reproduction information from the digital audio equipment 12 and performs control so as to display the audio reproduction information on the display unit 8 including, for example, a liquid crystal panel or an organic electro-luminescence (EL) panel. The audio control unit 1a further extracts information about a tune to be reproduced from the audio reproduction information and transfers the information about the tune to the speech recognition/TTS control unit 1b.

Speech by a user is input into the speech input unit 2 via the microphone 3. Then, the speech input unit 2 converts the speech to speech signal data to transfer the converted speech data to the speech recognition/TTS control unit 1b.

Speech data converted from a text by the TTS engine 6 is input into the reproduction unit 7. Then, the reproduction unit 7 reproduces speech according to the speech data and amplifies speech signals to supply the speech signals to the speaker 9.

The speech recognition/TTS control unit 1b retrieves information about a tune that is being reproduced as necessary via the audio control unit 1a.

The speech recognition/TTS control unit 1b further controls the whole process from a step of inputting speech to a step of outputting speech. The speech recognition/TTS control unit 1b causes the speech recognition engine 4 to recognize speech uttered by a user and input via the microphone 3 and the speech input unit 2. In speech recognition, as is the case with general recognition processing, acoustic analysis is performed on input speech to calculate features, and an acoustic model 10a (prepared as data in advance to be stored in a memory) corresponding to the utterance is extracted on the basis of the features. The speech is recognized on the basis of the acoustic model 10a and words stored in a speech recognition dictionary 10b.

The character-string-to-be-read-aloud generation unit 5 generates a character string to be input into the TTS engine 6 and to be read aloud. The character string is generated by combining a text template for a response to a question from a user and information about a tune, where the information about the tune replaces the portion of the text template corresponding to the replacement symbols. The character-string-to-be-read-aloud generation unit 5 further includes a function related to the present invention. In the function, when it is determined that the characters replacing the portion of replacement symbols in a text template cannot be read aloud, the text template is converted to a new text template from which a portion corresponding to a modifier including the portion of the replacement symbols is removed.

When a character string (a text) to be read aloud has been input into the TTS engine 6, the TTS engine 6 analyzes the text information on the basis of a language analysis dictionary included in TTS data 10d and generates intermediate language that is a character string representing readings and accents. The intermediate language is converted to speech (waveform) data with reference to a speech synthesis dictionary included in the TTS data 10d.

The storage unit 10 includes, for example, a hard disk or a semiconductor memory. For example, the acoustic model 10a and the speech recognition dictionary 10b used by the speech recognition engine 4, a character string processing table 10c referred to by the character-string-to-be-read-aloud generation unit 5, and the TTS data 10d read by the TTS engine 6 may be stored in separate areas in the storage unit 10. Moreover, the tune information data of a tune that is acquired from the digital audio equipment 12 and is being played back is stored in the storage unit 10. When a tune that is being played back is updated, the tune information data stored in the storage unit 10 may also be updated.

Text templates for respective responses to questions from users and rules for determining which base text template is applied to which question are stored in the character string processing table 10c. Moreover, when the text of tune information data replacing the portion of replacement symbols included in a text template for a response to a question cannot be read aloud, rules and the like for performing conversion of the text template are stored in the character string processing table 10c.

The TTS data 10d includes dictionaries (a language analysis dictionary and a speech synthesis dictionary) to be used when speech synthesis is performed by the TTS engine 6.

A language analysis dictionary is referred to when the syntax analysis of text information subjected to speech synthesis is performed. In the language analysis dictionary, the detailed information for each word, such as the notation, reading, accent, and part of speech, is registered in association with the word in advance. A speech synthesis dictionary may be referred to when text information analyzed by the TTS engine 6 is converted to corresponding speech (waveform) data.

In this information processing apparatus 100, when a user has made a question about the tune while the tune is being played back, an appropriate response text for the question is generated, and then the text is converted to speech to be output via the speaker 9 as a response.

When the speech recognition/TTS control unit 1b needs information about a tune that is being played back, the information is acquired via the audio control unit 1a or is acquired from the storage unit 10 storing the information.

In the TTS engine 6 converting a text to speech, an input text is precisely converted to speech. Thus, a text to be input into the TTS engine 6 is converted to an optimal text.

For example, when "This song is called <Song> by <Artist> from <Album>." is used as a text template for a response text, characters replacing <Song> and <Album> can be read aloud, and characters replacing <Artist> cannot be read aloud, the response text is converted to "This song is called <Song> from <Album>.", and a text is generated, using the converted text template, to be input into the TTS engine 6. Thus, a natural response text having no grammatical error can be read aloud.

A process of generating a text having no grammatical error will now be described. The embodiment covers the information processing apparatus 100, in which tunes stored in the digital audio equipment 12 are played back. Moreover, it is assumed that the information processing apparatus 100 is connected to the digital audio equipment 12, that all tune information is sent from tune data stored in the digital audio equipment 12 to the information processing apparatus 100, and that the tune data is stored in the storage unit 10 in the information processing apparatus 100.

The information processing apparatus 100 sends file path information corresponding to an indicated tune to the digital audio equipment 12 under the control of the audio control unit 1a and then plays back speech from the speaker 9 while receiving the tune data from the digital audio equipment 12.

Assuming a question of "What song is this?" has been input into the information processing apparatus 100, when the speech recognition engine 4 recognizes the question uttered by a user and determines that the user has requested the information of a tune indicating which tune is being played back, a base text template for a response to the question is extracted from the character string processing table 10c in the storage unit 10. The base text template may be prepared and stored in the character string processing table 10c in advance. A response text is generated by replacing the portion of replacement symbols (e.g. "<...>") in the base text template with a text of the tune information. It is then determined whether the audio signals of the text of the tune information can be generated by the TTS engine 6. If it is determined that the audio signals cannot be generated, the text is replaced with a space.

The TTS engine 6 converting an input text to speech to read the speech aloud depends on a language that can be handled by the TTS engine 6. When the TTS engine 6 cannot interpret the character code of the language, the TTS engine 6 cannot convert an input text to speech.

FIG. 2A is a diagram showing an exemplary character code table (ISO 8859-1). In the character code table, both characters that can be read aloud and characters that cannot be read aloud, using the TTS engine 6, exist. For example, it is assumed that the TTS engine 6 cannot convert characters in cells enclosed in double-ruled borders and cells enclosed in thick borders, out of the character codes, to speech signals. Since character codes in the cells enclosed in the double-ruled borders cannot be read aloud, the character codes are converted to spaces before being input into the TTS engine 6. Moreover, character codes in the cells enclosed in the thick borders cannot be directly read aloud. However, the respective readings of the character codes are defined so that the character codes can be read aloud. FIG. 2B shows examples of such definitions. When character codes that can be handled by the TTS engine 6 are American English, a character "#" corresponding to a character code 0x23, a character "&" corresponding to a character code 0x26, and a character "@" corresponding to a character code 0x40 are respectively converted to "number", "and", and "at", as shown in FIG. 2B. When character codes that can be handled by the TTS engine 6 are Canadian French or American Spanish, conversion is performed, as shown in FIG. 2B.

FIG. 3A shows exemplary base text templates for a response to a question about a tune. For example, (1) "It is <Song> by <Artist>.", (2) "This song is called <Song> by <Artist> from <Album>.", and (3) "This is called <Song> by <Artist> from <Album>." are prepared as base text templates, as shown in FIG. 3A. In the text templates, <Song>, <Artist>, and <Album> are a replacement symbol to be replaced with a tune name, a replacement symbol to be replaced with an artist name, and a replacement symbol to be replaced with an album name, respectively.

Candidate response texts are extracted from these base text templates and temporarily stored in a memory (not shown) in the speech recognition/TTS control unit 1b.

Then, the genre of a tune is detected, and a text template for a response to a question, for example, the text template corresponding to the genre of the tune, is selected. It is assumed that, the base text template of (2) is adopted when the genre of a tune is pop or rock, and the base text template of (3) is adopted when the genre of a tune is classical music or instrumental music from the base text templates shown in FIG. 3A. As shown in the base text templates of FIG. 3A, such relationships between base text templates and the genres of tunes may be defined in advance and stored in the character string processing table 10c in the storage unit 10.

Then, tune information about the tune being played back, such as the tune name and the artist name, is retrieved from the storage unit 10 and it determined whether the characters of the tune information can be read aloud, i.e., whether the characters of the tune information can be interpreted in a language recognized by the TTS engine 6.

When all the characters of items of the tune information to be substituted into the base text template for the response can be read aloud, the character-string-to-be-read-aloud generation unit 5 generates a text in which the portion of the base text template corresponding to the replacement symbols is replaced with the items of the tune information. On the other hand, when some of the characters cannot be read aloud, a text to be input into the TTS engine 6 is generated by changing a part of the base text template in a manner that depends on items of the tune information that cannot be read aloud. For example, when character codes supported by the TTS engine 6 are American English, Chinese characters and hiragana characters in Japanese cannot be handled and thus cannot be read aloud. In this case, when only the corresponding replacement symbols in the base text template are replaced with spaces, an unnatural text having grammatical errors may be generated. Thus, an appropriate text is generated by adjusting the text template in a manner that depends on items of the tune information that cannot be read aloud.

FIG. 3B shows exemplary base text template conversion rules for such conversion. The base text template conversion rules define how to convert a text template in a manner that depends on items of tune information that cannot be read aloud, as shown in FIG. 3B.

For example, according to rule no. 1 in FIG. 3B, when it is determined that an artist name cannot be read aloud, a text to be input into the TTS engine 6 is generated by removing the portion of "by <Artist>" from a base text template. Similarly, according to rule no. 2, when it is determined that an album name cannot be read aloud, the portion of "from <Album>" is removed from a base text template. Moreover, according to rule no. 3, when a tune name is determined as being incapable of being read aloud, new text templates are used.

Even in a case where any one of the items of tune information (an artist name, an album name, and a tune name) cannot be read aloud, a natural response text is generated by applying the base text template conversion rules. Exemplary conversion of a text template in a case where at least one item of tune information cannot be read aloud will next be described.

(a) A case where only the tune name cannot be read aloud

This is a case where, as a result of analysis by the character-string-to-be-read-aloud generation unit 5 on whether items of tune information can be read aloud, the tune name is found to be described in character codes that cannot be read aloud, for example, Chinese characters and hiragana characters in Japanese. In this case, the artist name and the album name are separately returned. For example, "This Track's Artist is <Artist>. This Track's Album is <Album>." is generated. In this manner, when the tune name cannot be read aloud, new text templates are used. Such new text templates are stored in advance in the character string processing table 10c in the storage unit 10.

(b) A case where only artist name cannot be read aloud

This is a case where, as a result of analysis by the character-string-to-be-read-aloud generation unit 5 on whether items of tune information can be read aloud, the artist name is found to be described in character codes that cannot be read aloud, for example, Chinese characters and hiragana characters in Japanese. In this case, a portion corresponding to a modifier including a replacement symbol to be replaced with the artist name and a preposition preceding the replacement symbol is removed from a text template. For example, a text "This song is called <Song> from <Album>." is generated.

(c) A case where only album name cannot be read aloud

This is a case where, as a result of analysis by the character-string-to-be-read-aloud generation unit 5 on whether items of tune information can be read aloud, the album name is found to be described in character codes that cannot be read aloud, for example, Chinese characters and hiragana characters in Japanese. In this case, a portion corresponding to a modifier including a replacement symbol to be replaced with the album name and a preposition preceding the replacement symbol is removed from a text template. For example, a text "This song is called <Song> by <Artist>." is generated.

(d) A case where only album name can be read aloud

This is a case where, as a result of analysis by the character-string-to-be-read-aloud generation unit 5 on whether items of tune information can be read aloud, the artist name and the tune name are found to be described in character codes that cannot be read aloud. In this case, a new text template including a replacement symbol to be replaced with the album name as a component is adopted. For example, a text "This Track's Album is <Album>." is generated.

(e) A case where only artist name can be read aloud

This is a case where, as a result of analysis by the character-string-to-be-read-aloud generation unit 5 on whether items of tune information can be read aloud, the tune name and the album name are found to be described in character codes that cannot be read aloud. In this case, a new text template including a replacement symbol to be replaced with the artist name as a component is adopted. For example, a text "This track's artist is <Artist>." is generated.

(f) A case where only tune name can be read aloud

This is a case where, as a result of analysis by the character-string-to-be-read-aloud generation unit 5 on whether items of tune information can be read aloud, the artist name and the album name are found to be described in character codes that cannot be read aloud. In this case, a portion corresponding to a modifier including a replacement symbol to be replaced with the artist name and a preposition preceding the replacement symbol and a portion corresponding to a modifier including a replacement symbol to be replaced with the album name and a preposition preceding the replacement symbol are removed from a text template. For example, a text "This song is called <Song>." is generated.

The rules for removing a part of a text template and the rules for using a new text template in the foregoing cases are stored in advance in the character string processing table 10c in the storage unit 10.

When a tune name, an artist name, and an album name are all described in character codes that cannot be read aloud, a speech response cannot be returned, and thus a response stating that a speech response cannot be returned is returned.

Moreover, when the genre of a tune is classical music or instrumental music, for example, the base text template of (3) in FIG. 3A is selected, and the base text template is adapted to the cases (a) to (f). For example, in the case (b) where only an artist name cannot be read aloud, the base text template is converted to "This is called <Song> from <Album>."

Examples in which appropriate texts are generated by the application of the foregoing rules will now be described, using FIGS. 4A and 4B.

FIG. 4A shows four examples of tune data acquired from the digital audio equipment 12. In each of the examples, tune information including a tune name, an artist name, an album name, a composer's name, and a genre is acquired.

Example 1 is a case where the genre of a tune is pop, and characters of items of tune information replacing the replacement symbols in a base text template can be all read aloud. In this case, a text is generated by replacing the replacement symbols in the base text template with the items of the tune information. The generated text is "This song is called Happy Song by Mariah Carey from All of You."

Example 2 is a case where the genre of a tune is pop, and only the characters of the artist name cannot be read aloud. In this case, "by <Artist>" is removed from the base text template by applying base text template conversion rule no. 1 to the base text template to convert the text template to "This song is called <Song> from <Album>." FIG. 4B shows a case where items of data of tune information in the case of example 2 are converted to items of data to be input into the TTS engine 6. The character-string-to-be-read-aloud generation unit 5 determines whether characters of tune information can be read aloud. When the character-string-to-be-read-aloud generation unit 5 determines that the characters of the tune information correspond to character codes that are not supported by the TTS engine 6, the characters are converted to a space so as to make it clear that the characters cannot be converted to speech. As a result, regarding the artist name, data extracted from the digital audio equipment 12 is converted to a space as TTS input data, as shown in FIG. 4B.

When the character-string-to-be-read-aloud generation unit 5 refers to TTS input data and finds an item of tune information that is a space, the character-string-to-be-read-aloud generation unit 5 determines that the characters of the item of the tune information cannot be read aloud. The character-string-to-be-read-aloud generation unit 5 then performs conversion of a corresponding text template by applying a corresponding base text template conversion rule to the text template. In the case of example 2, the base text template is "This song is called <Song> by <Artist> from <Album>.". Since it is determined that the artist name cannot be read aloud, the text template is converted to "This song is called <Song> from <Album>." Replacement symbols in the text template are replaced with the corresponding information text. Thus, in this case, the text to be input into the TTS engine 6 is "This song is called One Night Magic from ULTRA BLUE."

Example 3 is a case where the genre of a tune is rock, and only the artist name can be read aloud. Base text template conversion rules nos. 2 and 3 are applied to this case. Moreover, new text templates are applied with priority, and out of the new text templates, a text related to the album is not used. Thus, a replacement symbol in the other new text template is replaced with the artist name, so that a text to be input into the TTS engine 6 is "This track's artist is T-BOLAN.".

Example 4 is a case where the genre of a tune is classical music, and the characters of the items of tune information that replace the replacement symbols in the base text template can be all read aloud. In this case, a text is generated by replacing the replacement symbols in the base text template with the items of the tune information. The generated text is "This is called Piano Concerto #21 in C, K467 by Royal Philharmonic Orchestra from The Great Piano Concertos Vol. 1."

Figure 5:
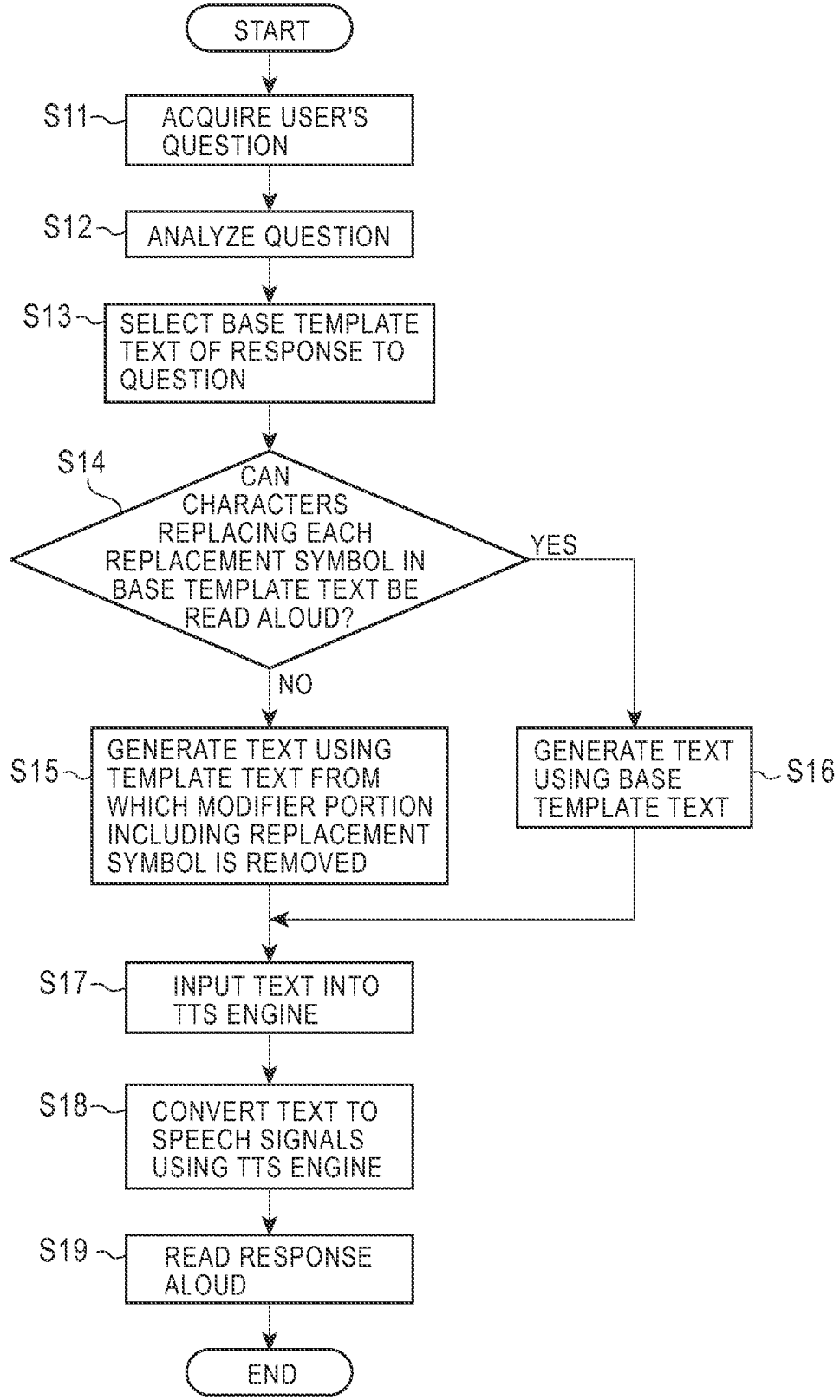
FIG. 5 is a flowchart showing an exemplary process of reading a text aloud by TTS.
Figure 6:
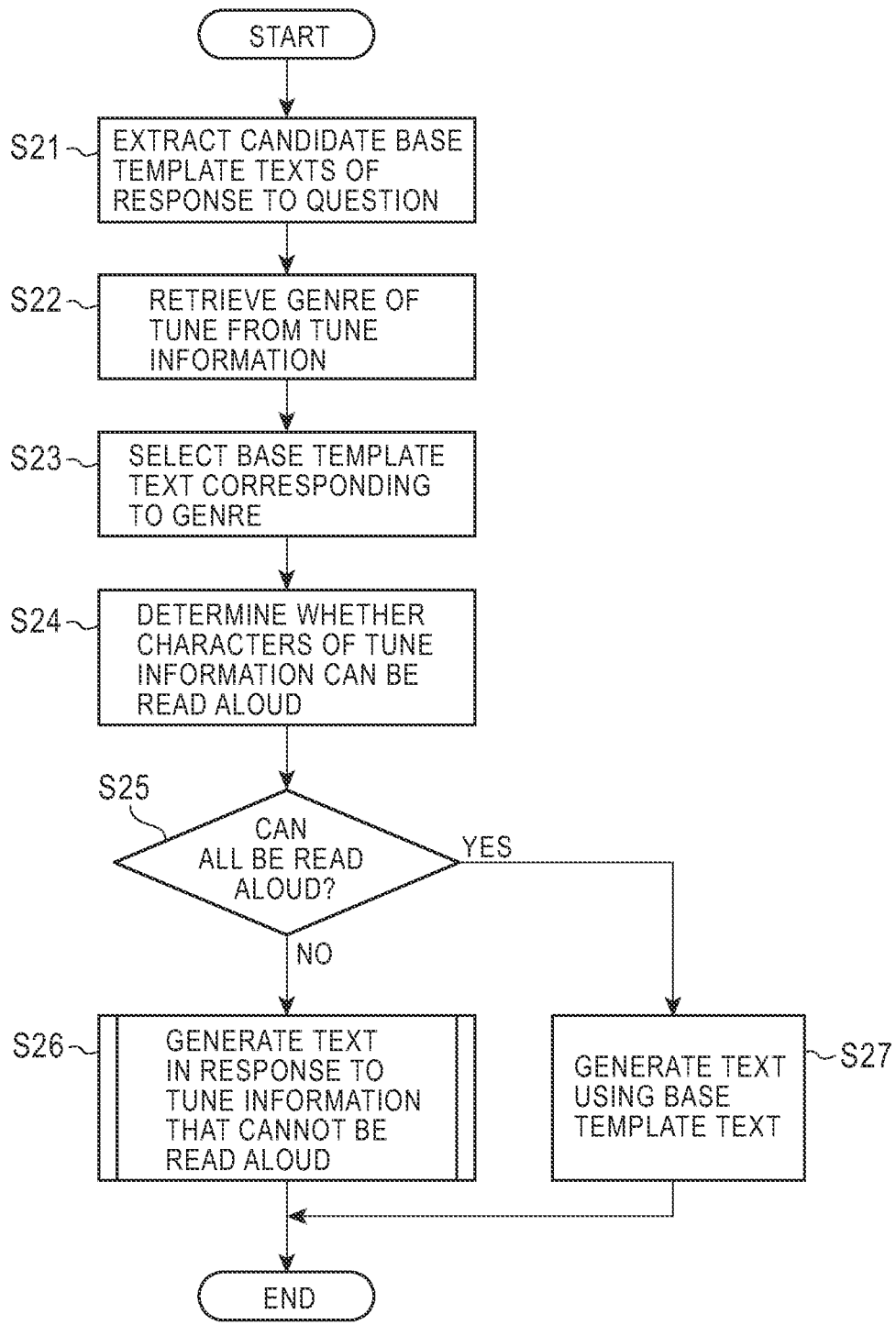
FIG. 6 is a flowchart showing an exemplary process of generating a response when a corresponding question is that about a tune.
Figure 7:
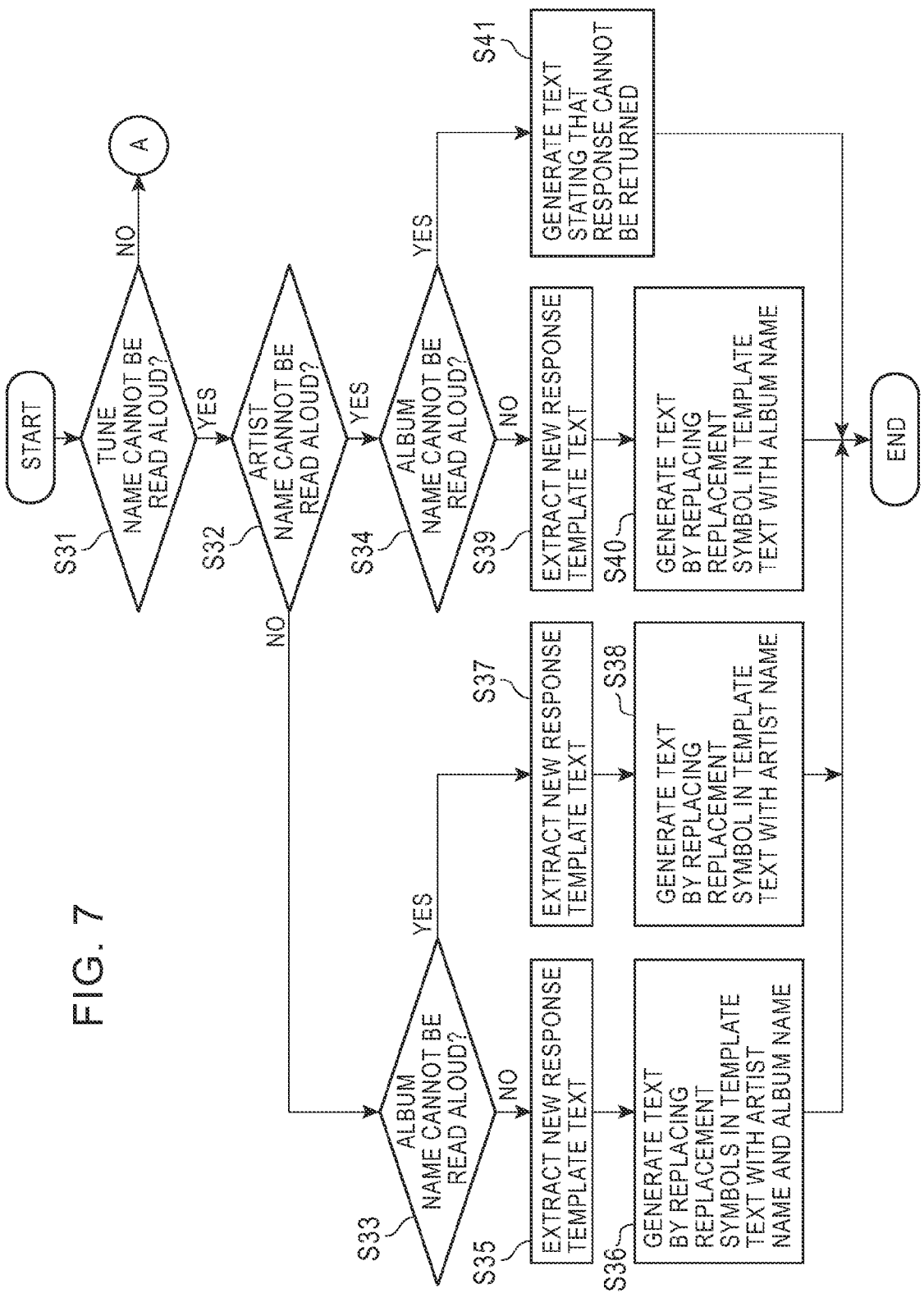
FIG. 7 is a flowchart (1) showing an exemplary process of generating a response text corresponding to items of tune information that cannot be read aloud.

Processes of generating a natural text for a response to a question about a tune will next be described with reference to FIGS. 5 to 8. FIG. 5 is a flowchart of a process of reading a text aloud by the information processing apparatus 100 using TTS. FIG. 6 is a flowchart of a process of generating a response when a corresponding question is asked about a tune. FIGS. 7 and 8 are flowcharts showing an exemplary process of generating a response text corresponding to items of tune information that cannot be read aloud. In these processes, it is assumed that data such as tune information acquired from the digital audio equipment 12 is stored in the storage unit 10 for each tune. Moreover, it is assumed that text templates for respective responses to questions are defined and stored in the character string processing table 10c in the storage unit 10 in advance, and that text template conversion rules corresponding to items of tune information that cannot be read aloud are also defined and stored in the character string processing table 10c in the storage unit 10 in advance.

In step S11 in FIG. 5, first a question uttered by a user is accepted. The speech uttered by the user is input into the speech input unit 2 via the microphone 3. Then, the speech input unit 2 converts the speech to data such as speech signals so that the data can be output to the speech recognition/TTS control unit 1b.

Then, in step S12, user's the question is analyzed. The speech recognition/TTS control unit 1b transfers the input speech signals to the speech recognition engine 4. Then, the speech recognition engine 4 recognizes the question from the user with reference to, for example, the acoustic model 10*a* and the speech recognition dictionary 10*b*.

Then, in step S13, a text template for a response to the question from the user is selected. The speech recognition/TTS control unit 1*b* determines what category the question from the user recognized by the speech recognition engine 4 belongs to, and extracts the text template for the response to the question from the storage unit 10 that holds the text template (in advance). Moreover, characters replacing the portion of each replacement symbol included in the text template are extracted from data related to the question. For example, when the question is that about a tune, and a replacement symbol in the response text corresponds to the tune name, the tune name is extracted from corresponding tune information.

Then, in step S14, it is determined whether characters replacing the portion of the replacement symbol in the text template for the response can be read aloud. When it is determined that the characters can be read aloud, the process proceeds to step S16. Otherwise, the process proceeds to step S15. The determination of Step 5 is determined by determining whether the characters correspond to character codes that can be handled by the TTS engine 6.

In step S15, a modifier equivalent portion of the text template, which includes the replacement symbol, is removed from the text template to convert the text template to a new text template, and a natural text is generated, using the new text template. On the other hand, in step S16, a text is generated, using the base text template.

Then, in step S17, the text generated in step S15 or S16 is input into the TTS engine 6.

Then, in step S18, the text input into the TTS engine 6 is converted to speech signals under the control of the speech recognition/TTS control unit 1*b*.

Then, in step S19, the response text converted to the speech signals by the TTS engine 6 is read aloud via the reproduction unit 7 and the speaker 9.

A text having no grammatical error is read aloud in response to a question from a user by the foregoing process.

The processes of generating a speech response when a question from a user is about a tune will next be described with reference to FIGS. 6-8. FIGS. 7 and 8 are the flowcharts showing the exemplary process of generating a response text corresponding to items of tune information that cannot be read aloud in the process in FIG. 6.

In step S21 of FIG. 6, first, candidate base text templates for a response to a question are selected. In this process, since the question is about a tune, the base response text templates shown in FIG. 3A are selected as the candidates from the base text templates for responses. The selected base response text templates are temporarily stored in a memory.

Then, in step S22, the genre information of the tune is retrieved from the tune information. The tune information is acquired from, for example, the digital audio equipment 12 and stored in the storage unit 10. A playback-in-process flag indicating whether a tune is being played back or not is prepared in advance as an attribute of tune data stored in the storage unit 10. Tune data that is being played back is retrieved by referring to the playback-in-process flag, and the genre is detected referring to genre information of the tune information of the tune data.

Then, in step S23, a base text template corresponding to the genre of the tune retrieved in step S22 is selected. For example, when the genre of the tune is pop or rock, the base response text template (2) in FIG. 3A is selected, and when the genre of the tune is classical music or instrumental music, the base response text template (3) in FIG. 3A is selected. The selected base response text template is left in the memory and the remaining base response text templates having not been selected are discarded.

Then, in step S24, it is determined whether the characters of the tune information can be read aloud. The characters replace the portion of replacement symbols in the base text template. When the characters cannot be read aloud, for example, when the characters are Japanese such as Chinese characters in a case where character codes supported by the TTS engine 6 are American English, the characters are replaced with a space. The characters of the tune information are extracted from the storage unit 10 and temporarily stored in the memory.

Then, in step S25, it is determined whether the characters described in the tune information can be all read aloud. If it is determined that the characters can be all read aloud, the process proceeds to step S27. If it is determined that a character that cannot be read aloud exists, the process proceeds to step S26. This determination of whether a character out of the characters of the tune information that cannot be read aloud exists is determined by referring to the TTS input data created in step S24. For example, in the tune data shown in FIG. 4B, since the information of the artist name is described in Chinese characters, the characters are converted to a space. When TTS input data includes a space, it is determined that a character that cannot be read aloud exists.

In step S26, a text for the response is generated in a manner that depends on items of the tune information that cannot be read aloud and the process is terminated. On the other hand, in step S27, if it is determined in step S25 that all the tune information can be read aloud, a text for the response is generated by replacing the replacement symbols in the text template with the tune information, and the process is terminated.

FIGS. 7 and 8 are the flowcharts showing the details of the process in step S26 in FIG. 6. In this process, cases are identified by determining whether three types of characters (e.g. a tune name, an artist name, and an album name) replacing replacement symbols included in a text template of tune information can be read aloud, and determine what text is generated for each of the cases.

When the tune name cannot be read aloud (YES in step S31), the artist name can be read aloud (NO in step S32), and the album name can be read aloud (NO in step S33), a new response text template is extracted in step S35, and a text is generated by replacing replacement symbols in the response text template with the artist name and the album name in step S36.

When the tune name cannot be read aloud (YES in step S31), the artist name can be read aloud (NO in step S32), and the album name cannot be read aloud (YES in step S33), a new response text template is extracted in step S37, and a text is generated by replacing a replacement symbol in the response text template with the artist name in step S38.

When the tune name cannot be read aloud (YES in step S31), the artist name cannot be read aloud (YES in step S32), and the album name can be read aloud (NO in step S34), a new response text template is extracted in step S39, and a text is generated by replacing a replacement symbol in the response text template with the album name in step S40.

When the tune name cannot be read aloud (YES in step S31), the artist name cannot be read aloud (YES in step S32), and the album name cannot be read aloud (YES in step S34), the process proceeds to step S41 where an output text stating that no response can be returned is generated.

When the tune name can be read aloud (NO in step S31), the artist name cannot be read aloud (YES in step S42), and the album name can be read aloud (NO in step S43), in step S45, a part of the text template is removed. The removed part is a modifier equivalent portion including the corresponding replacement symbol to be replaced with the artist name. In step S46, a text is generated by replacing the corresponding replacement symbols in the text template, a part of which has been removed, with the tune name and the album name.

When the tune name can be read aloud (NO in step S31), the artist name cannot be read aloud (YES in step S42), and the album name cannot be read aloud (YES in step S43), in step S47, a part of the text template is removed. The removed part includes a modifier equivalent portion including the corresponding replacement symbol to be replaced with the artist name and a modifier equivalent portion including the corresponding replacement symbol to be replaced with the album name. In step S48, a text is generated by replacing the corresponding replacement symbol in the text template, a part of which has been removed, with the tune name.

When the tune name can be read aloud (NO in step S31), the artist name can be read aloud (NO in step S42), and the album name cannot be read aloud (YES in step S44), in step S49, a part of the text template is removed. The removed part is a modifier equivalent portion including the corresponding replacement symbol to be replaced with the album name. In step S50, a text is generated by replacing the corresponding replacement symbols in the text template, a part of which has been removed, with the tune name and the artist name.

When the tune name can be read aloud (NO in step S31), the artist name can be read aloud (NO in step S42), and the album name can be read aloud (NO in step S44), in step S51, a text is generated by replacing the replacement symbols in the text template with the tune name, the artist name, and the album name.

When a text is generated in step S26 in FIG. 6, the details of which have been described with reference to FIGS. 7 and 8, the text is input into the TTS engine 6, and then an appropriate speech response to a question is returned.

In the information processing apparatus and the text-to-speech method according to this embodiment, text templates for responses including replacement symbols are prepared for questions from users, as described above. The portion of each replacement symbol is replaced with the characters of a corresponding item of tune information. When the characters of an item of tune information cannot be read aloud, a portion corresponding to a modifier including a replacement symbol to be replaced with the item of the tune information is removed from a corresponding text template to perform conversion of the text template, and a text to be input into the TTS engine is generated using the converted text template. Thus, even when a part of information is missing because the information includes characters that cannot be read aloud, a natural response text having no grammatical error can be read aloud.

While the embodiment has been described, assuming that a language supported by the TTS engine is American English, it should be understood that the language is not limited to American English. The embodiment can be applied to all languages by defining text template conversion rules such that, when characters that cannot be read aloud are converted to a space in a manner that depends on the language, no grammatical error occurs.

Moreover, while a case where items of tune information to be substituted into a text template are a tune name, an artist name, and an album name has been described in FIGS. 3A and 3B, showing three response text templates to questions about tune information. However, the case is not restrictive, and other items of tune information, for example, a composer's name, may be covered.

Moreover, a case where all the characters of, for example, a tune name in tune name can be or cannot be read aloud has been described as an example. However, only some of the characters can be read aloud. In this case, only the characters, which can be read aloud, may be left as a text, or all the characters may be determined as being incapable of being read aloud. When all the characters are determined as being incapable of being read aloud, incorrect information is not output.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

The invention claimed is:

1. An information processing apparatus in communication with an apparatus configured to store and playback audio data, the audio data including tune data, and tune information in the form of character text or word text corresponding to the tune data, the information processing apparatus comprising:
   an oral reading unit configured to convert text to speech data, and output the speech data;
   an input unit for inputting a question from a user corresponding to the tune data;
   a storage unit configured to store a plurality of text templates corresponding to predetermined responses to the questions, and configured to store a plurality of text template conversion rules, each text template having a predetermined associated genre;
   a control unit configured to retrieve the tune information associated with the tune data;
   wherein the control unit analyzes the question from the user corresponding to the tune data, and selects a text template corresponding to a response to the question and based upon the predetermined associated genre, the selected text template having substitution symbols corresponding to the character text or word text associated with the tune data;
   wherein if the control unit determines that the substitution symbols in the selected text template corresponding to the character text or word text cannot be read aloud, a new text template is generated based on the selected text template, and the substitution symbols that cannot be read aloud are modified in accordance with the conversion rules such that all portions of the new text template can be read aloud, and wherein the new text template read aloud contains no silent portions; and
   wherein the control unit causes the oral reading unit to read the text aloud corresponding to the new text template.

2. The information processing apparatus according to claim 1, wherein the control unit selects the text template based on the genre of a tune corresponding to the question.

3. The information processing apparatus according to claim 1, wherein if at least one of the substitution symbols cannot be read aloud, the control unit generates modified text data using the selected text template, wherein the substitution symbol is removed or replaced.

4. The information processing apparatus according to claim 3, wherein if a substitution symbol corresponding to an artist name cannot be read aloud, the control unit generates the new text template such that the substitution symbol corresponding to the artist name, is removed.

5. The information processing apparatus according to claim 3, wherein if a substitution symbol corresponding to an album name cannot be read aloud, the control unit generates the new text template such that the substitution symbol corresponding to the album name, is removed.

6. The information processing apparatus according to claim 3, wherein if a substitution symbol corresponding to a tune name cannot be read aloud, the control unit extracts, from the storage unit, a new text template having a substitution symbol corresponding to an artist name of the tune as a first component, and having a substitution symbol corresponding to an album name of the tune as a second component, and generates the new text template.

7. The information processing apparatus according to claim 3, wherein if only a substitution symbol corresponding to an artist name can be read aloud, the control unit extracts, from the storage unit, a new text template having a substitution symbol corresponding to the artist name as a component, and generates the new text template.

8. The information processing apparatus according to claim 3, wherein if only a substitution symbol corresponding to an album name can be read aloud, the control unit extracts, from the storage unit, a new text template having a substitution symbol corresponding to the album name as a component and generates the new text template.

9. The information processing apparatus according to claim 3, wherein if only a substitution symbol corresponding to a tune name can be read aloud, the control unit generates the new text template such that the substitution symbols corresponding to an artist name of the tune and an album name of the tune, are removed.

10. A text-to-speech method comprising the steps of:
a) analyzing a question received by an information processing apparatus from a user regarding audio data stored in a storage unit, the audio data including tune data, and tune information in the form of character text or word text corresponding to the tune data, wherein the information processing apparatus is configured to convert text data to speech data;
b) extracting a text template from a plurality of predetermined text templates stored in the storage unit, the extracted text template corresponding to the question analyzed and corresponding to a predetermined associated genre;
c) detecting substitution symbols in the extracted text template corresponding to the character text or word text associated with the tune data;
d) converting the extracted text template to a new text template if the substitution symbols in the extracted text template corresponding to the character text or word text cannot be read aloud;
e) replacing the substitution symbols that cannot be read aloud with substitution symbols that can be read aloud, or removing the substitution symbols that cannot be read aloud, in accordance with predetermined conversion rules; and
f) converting the text of the new text template to speech data for output of the speech data, and wherein the new text template read aloud contains no silent portions.

11. The text-to-speech method according to claim 10, further comprising:
selecting candidates for the text template from the plurality of text templates stored in the storage unit, wherein the candidates are selected that provide a response to the question;
detecting the genre corresponding to the tune data that is a subject of the question, by analyzing the tune information corresponding to the tune data, and
selecting a text template corresponding to the detected genre from the candidates.

12. The text-to-speech method according to claim 11, further comprising:
g) determining if at least one of the substitution symbols cannot be read aloud; and
h) converting the text template to the new text template by removing or replacing the substitution symbols that cannot be read aloud.

13. The text-to-speech method according to claim 12, wherein if a substitution symbol corresponding to an artist name cannot be read aloud, the information processing apparatus converts the text template to the new text template such that the substitution symbol corresponding to the artist name is removed.

14. The text-to-speech method according to claim 12, wherein if a substitution symbol corresponding to an album name cannot be read aloud, the information processing apparatus converts the text template to the new text template such that the substitution symbol corresponding to the album name is removed.

15. The text-to-speech method according to claim 12, wherein if a substitution symbol corresponding to a tune name cannot be read aloud, the information processing apparatus generates the new text template from the storage unit having a substitution symbol corresponding to an artist name of the tune as first component, and having a substitution symbol corresponding to an album name of the tune as a second component, to generate the new text template.

16. The text-to-speech method according to claim 12, wherein if only a substitution symbol corresponding to an artist name can be read aloud, the information processing apparatus extracts the new text template having a substitution symbol corresponding to the artist name as a component.

17. The text-to-speech method according to claim 12, wherein if only a substitution symbol corresponding to an album name can be read aloud, the information processing apparatus extracts a new text template having a substitution symbol corresponding to the album name as a component.

18. The text-to-speech method according to claim 12, wherein if only a substitution symbol corresponding to a tune name can be read aloud, the information processing apparatus generates the text template such that the substitution symbols corresponding to an artist name of the tune, and an album name of the tune, are removed.

* * * * *